United States Patent [19]

Wen

[11] Patent Number: 5,649,256
[45] Date of Patent: Jul. 15, 1997

[54] ADJUSTABLE MEANS FOR A MONITOR CAMERA

[75] Inventor: Tien-chi Wen, Shinjuang, Taiwan

[73] Assignee: Fifty Cycle Video Laser Device Co. Ltd., Taipei, Taiwan

[21] Appl. No.: 654,572

[22] Filed: May 29, 1996

[51] Int. Cl.$^6$ .................................................. G03B 29/00
[52] U.S. Cl. ............................................ 396/427; 396/428
[58] Field of Search ................................ 396/419, 427, 396/428

[56] References Cited

U.S. PATENT DOCUMENTS

| | | | |
|---|---|---|---|
| 365,435 | 6/1887 | Freeman | 396/428 |
| 3,586,278 | 6/1971 | Simons | 396/428 |
| 5,404,182 | 4/1995 | Nomura | 396/428 |

*Primary Examiner*—David M. Gray
*Attorney, Agent, or Firm*—Watson Cole Stevens Davis, P.L.L.C.

[57] ABSTRACT

An adjustable device for a monitor camera includes a-cone-shaped body which has an opening at a decreasing end, a cylindrical projection, a cushion with a rough surface, a spherical body with a link extended axially and a cylindrical cover having two ends one of which has a plurality of barbs and a number of stripes thereon, the other end has an arc hole. A peripheral side wall of the end has a plurality of ribs extended latitudinally and a plurality of stripes thereon. The ribs connect with the cylindrical projection which projects out from the opening and has a seat on a distal end. The cushion is configured and situated within the seat of the cylindrical projection. The spherical body then rests on the cushion after the link is inserted through the arc hole and the barbs are inserted into the holes and firmly engage with the peripheral side wall of the inner surface. Because of the rough surface of the cushion and the rough surface of the spherical body, when the barbs of the cylindrical cover are inserted into the holes of the cone-shaped body, the spherical body securely engages with the rough surface of the cushion, so as to support the weight of a monitor camera.

3 Claims, 4 Drawing Sheets

ADJUSTABLE MEANS FOR A MONITOR CAMERA

FIELD OF THE INVENTION

The present invention generally relates to an adjustable means, and more particularly to an adjustable means for a monitor camera.

BACKGROUND OF THE INVENTION

This invention has a particular application to an adjustable means for a monitor camera, which eliminates the inaccuracy of the prior monitor camera especially when mounted with mechanical mechanism.

Monitor cameras have been used widely spread all over the world in various businesses. Because of the fast growth of-tele-communications and electronics, monitor cameras have a profound influence in the everyday lives of people, such that people become more and more dependent on monitor cameras.

Prior monitor cameras, when mounted on walls or any other particular places, are usually mounted with screws and the lenses are also securely enclosed by a cover, which often causes difficulty in angle adjustment thereof. Because adjusting the angle of a prior monitor camera often requires slackening of all the screws used to secure the cover of the lens, it takes too much effort to complete this what should be a simple job.

Therefore, the present invention provides an improved adjustable means to mitigate and/or obviate the aforementioned problems.

SUMMARY OF THE INVENTION

In accordance with one aspect of the invention, the main objective of the invention is to provide an adjustable means for a monitor camera which uses no screws on the angle adjustment mechanism, and instead, uses a rough surface to create adhesive friction between a spherical body and a seat to retain in a desired position of the monitor camera after the adjustment of the angle is set.

In accordance with another aspect of the present invention, another objective is to provide an adjustable means which is easy to assemble and compact in size.

Still another objective of the invention is to provide an adjustable means for a monitor camera. The adjustable means comprises a cone having a cylindrical projection extended axially, a cushion having a rough surface, a spherical body integrally extended a link and a cylindrical cover having an arc opening. The cylindrical projection has a distal end with a seat thereon for receiving the cushion. The surface of the spherical body is rough thus creating adhesive friction between the cushion and the spherical body after the spherical body has been inserted into the cylindrical cover from the extended link.

Other objects, advantages and novel features of the invention Will become more apparent from the following detailed description when taken in conjunction with the accompanying drawings.

BRIEF DESCRIPTION OF THE DRAWINGS

The present invention will now be better understood with the reference of the accompanying drawings wherein;

FIG. 14 is a cross sectional view similar to FIG. 3 but showing the movement of the cylindrical cover within the cone;

DETAILED DESCRIPTION OF THE PREFERRED EMBODIMENT

Figure 1:
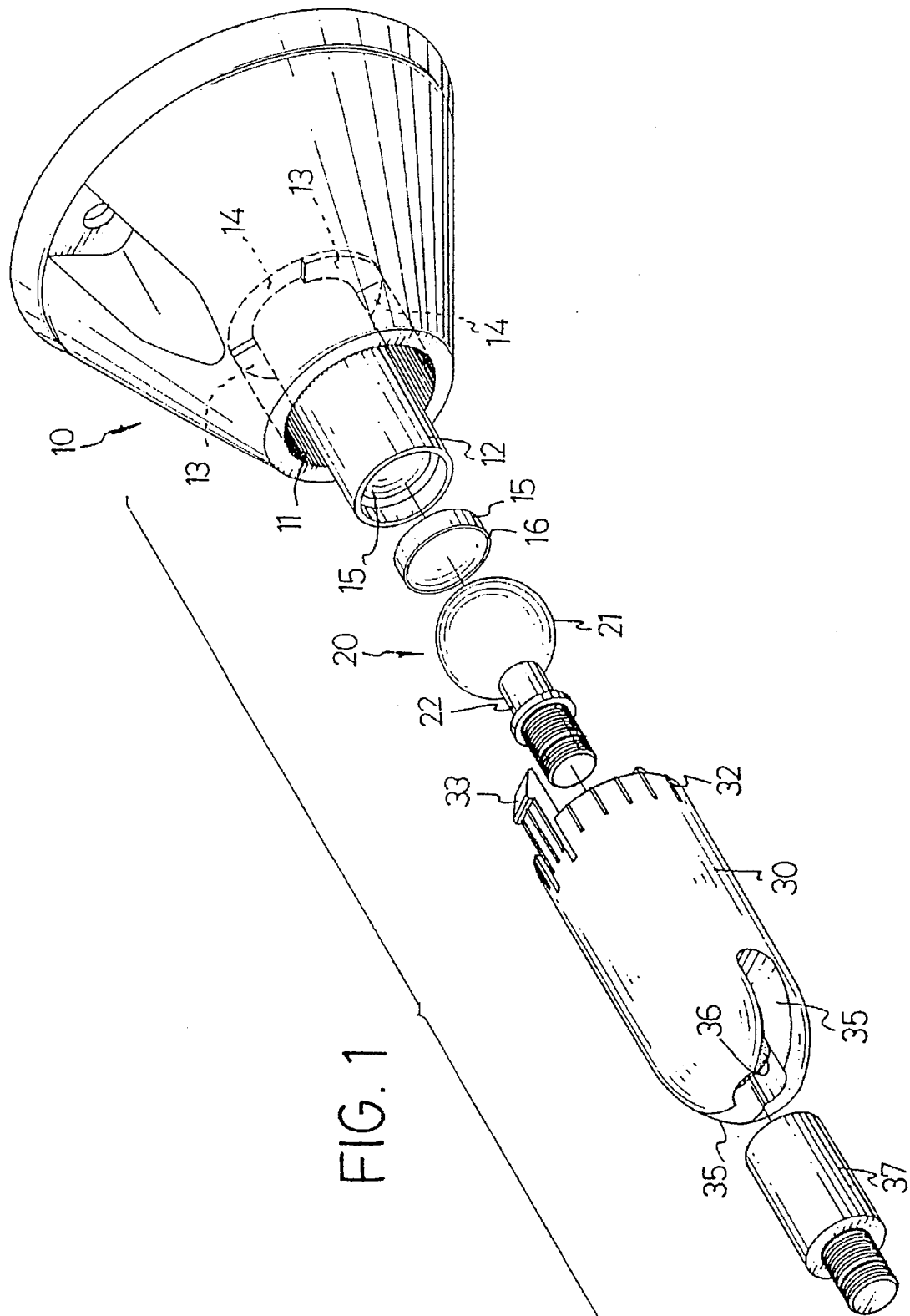
FIG. 1 is an exploded view of an adjustable means constructed in accordance with the invention.
Figure 2:
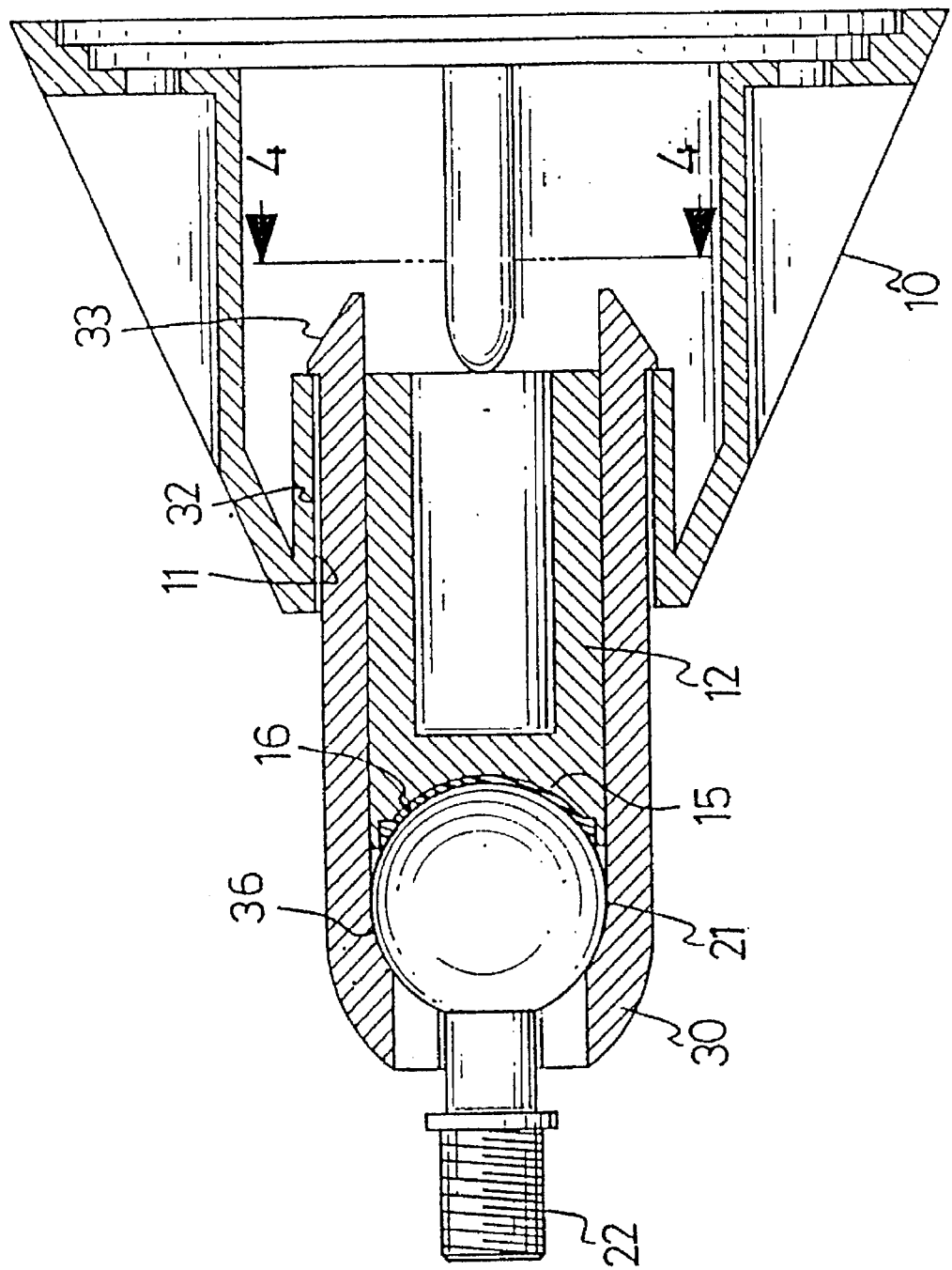
FIG. 2 is a cross sectional view of the adjustable means after being assembled.

Referring to the drawings and particularly FIGS. 1, and 2, an adjustable means constructed in accordance with the invention is shown. The adjustable means comprises a cone 10 having an opening (not numbered) defined by an inner periphery, and the periphery having formed thereon a plurality of longitudinal first ridges 11 at a decreasing end (not numbered) and a cylindrical projection 12 projecting out from the opening and connected with the cone 10 by a plurality of ribs 13 formed integrally with the cone 10, a cushion 15 having a rough concave 16, a spherical body 20 with a rough surface 21 having a link 22 extended axially therefrom, a hollow cylindrical cover 30 having a plurality of barbs 33 extended out from one end and an arcuate hole 35 defined at the other end.

Because the cylindrical projection 12 is connected with the cone 10 by a plurality of ribs 13, a plurality of slots 14 are defined. The cushion 15 is configured to mate with a seat 17 of one distal end of the cylindrical projection 12 and is placed on the seat 17 with its rough concave 16 facing outward. The spherical body 20 is inserted into the cylindrical cover 30 with the link 22 projecting out from the arcuate hole 35 of the cylindrical cover 30. The combined cylindrical cover 30 and spherical body 20 are fitted to the combined cone 10 and the cushion 15 by inserting the barbs 33 into the slots 14, until the barbs 14 extend beyond the opening to hook against an end face perpendicular to the inner periphery of the cone 10. Now the rough surface 21 of the spherical body 20 will engage with the rough concave 16 of the cushion 15 (as shown in FIG. 2) to creat adhesive friction.

The cylindrical cover 30 has on its one end a plurality of second ridges 32 similar to the first ridges 11 of the cone 10, so that the cylindrical cover 30 will firmly engage with the cone 10 when the barbs 33 are inserted into the slots 14 and the second ridges 32 of the cylindrical cover 30 contact with the first ridges 11 of the cone 10.

It is clearly seen from FIG. 2, that after all parts are assembled together, the cylindrical projection 12 projects into the cylindrical cover 30, and the cylindrical cover 30 is firmly secured by the engagement of the barbs 33 with the end face side wall of the cone 10.

Figure 3:
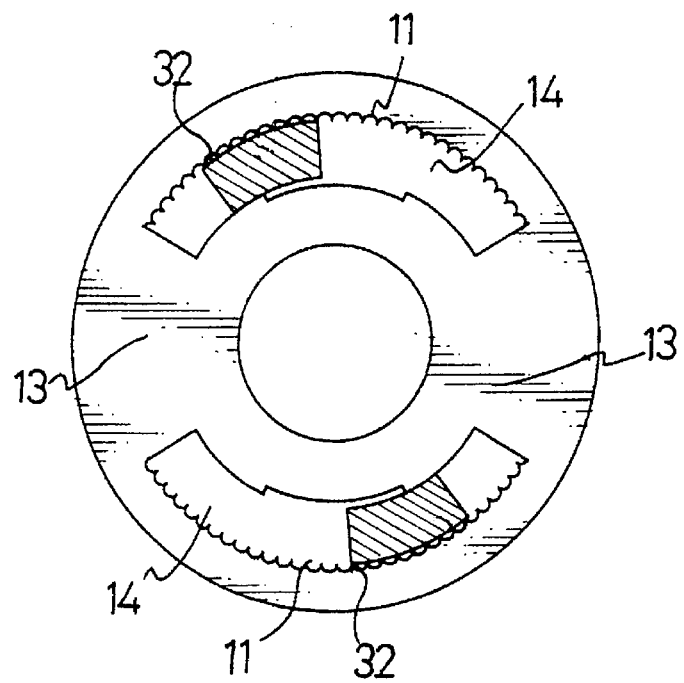
FIG. 3 is a cross sectional view taken along line 3—3 of FIG. 2 showing the related position while the cylindrical cover is mounted within the cone.
Figure 4:
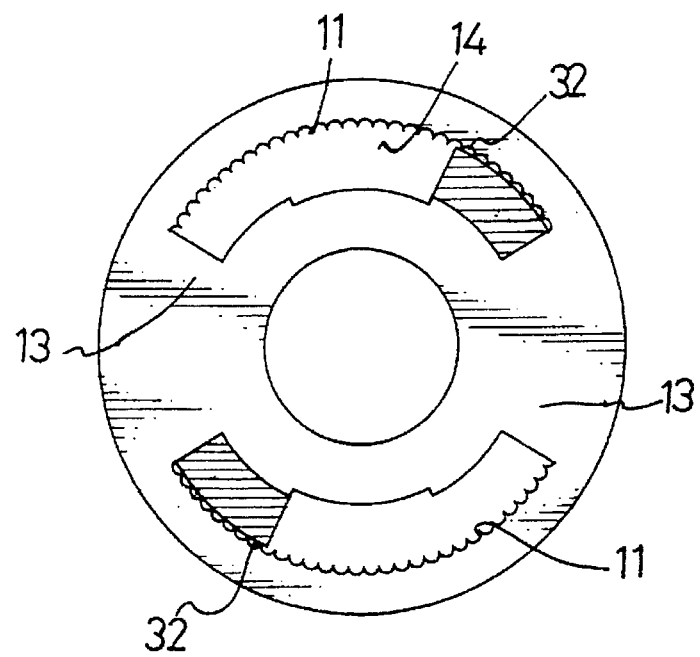

Referring to FIGS. 3 and 4, when an angle adjustment is required, not only does the arcutae hole 35 of the cylindrical cover 30 provide a space for the cylindrical projection 12 of the cone 10 to move latitudinally, but also the hole 14 of the cone 10 provides a space for the cylindrical cover 30 to move longitudinally.

Figure 5:
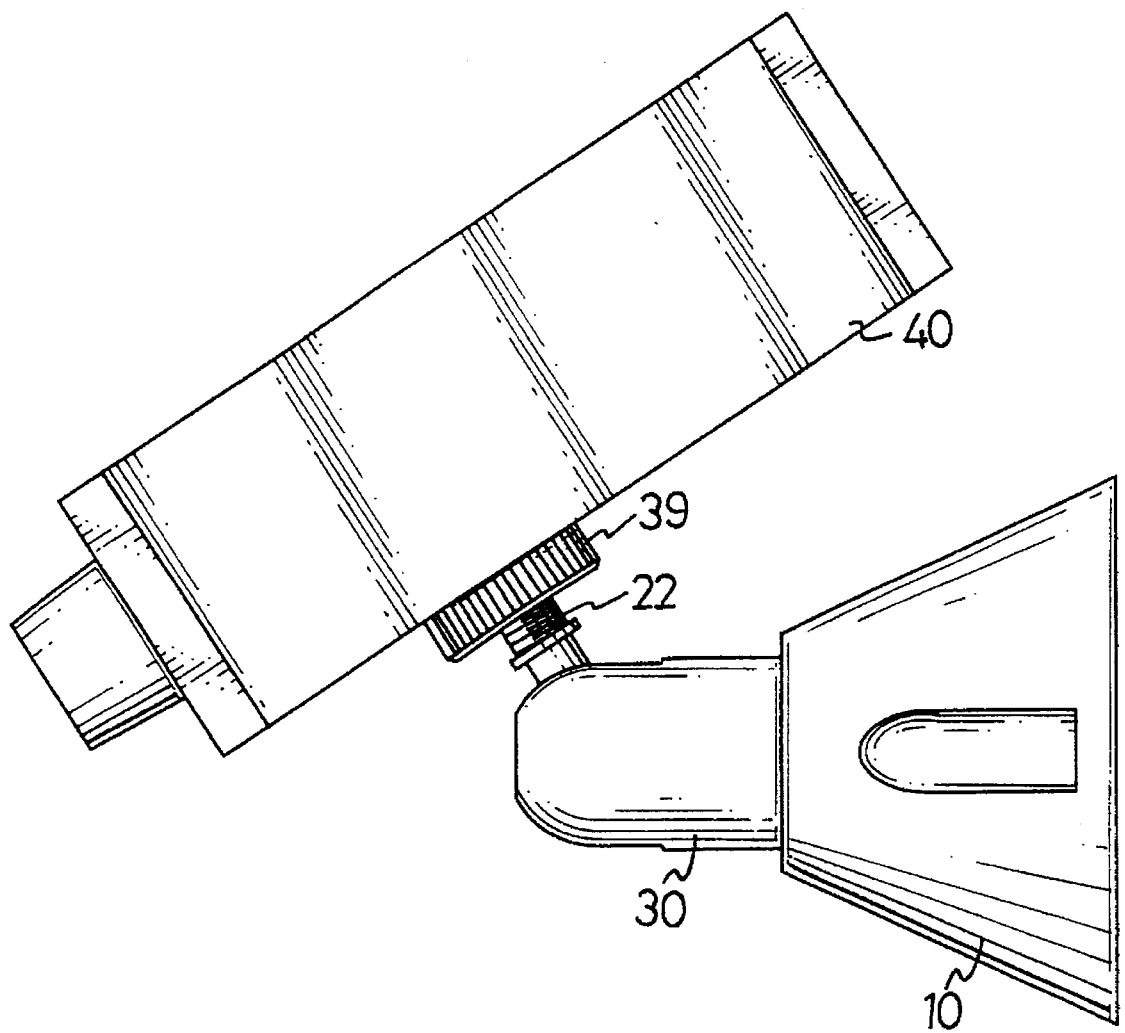
FIG. 5 is one preferred embodiment of the invention.

Referring to FIG. 5, from one preferred embodiment of the invention, it is noted that a monitor camera 40 is mounted onto one distal end of the link 22 of the spherical body 20.

To further enhance the adhesive friction of the invention to support the weight of the monitor camera 40, a rough surface 36 may be provided to an inner face of the cylindrical cover 30 where the spherical body 20 is engaging with.

Referring again to FIG. 1, an extention rod 37 may be provided to the link 22 to increase the length after the spherical body 20 is inserted into the hollow cylindrical cover 30.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. An adjustable means for a monitor camera comprising:

a body having an opening with a plurality of ridges on an inner peripheral side wall, a plurality of ribs formed integrally with said peripheral side wall and a plurality of slots defined between said ribs;

a cylindrical projection having two distal ends one of which is connected with said ribs of said body and the other projects out from said opening and having a seat thereon;

a cushion being configured to mate with said seat and having a rough concave;

a spherical body being configured to mate with said cushion and having a link extending axially therefrom;

a hollow cylindrical cover comprising a plurality of barbs extending outward and fitted into said slots of said body to firmly secure said cylindrical cover with said body, a plurality of second ridges defined integrally with a peripheral side wall of said cylindrical cover and an arcuate hole permitting said link of said spherical body to move latitudinally.

2. The adjustable means as claimed in claim 1, wherein a rough surface is provided to an inner peripheral side wall of said cylindrical cover.

3. The adjustable means as claimed in claim 1, wherein an extension rod is provided to said link to increase the length of said link.

* * * * *